US009945609B2

(12) United States Patent
Naito

(10) Patent No.: US 9,945,609 B2
(45) Date of Patent: Apr. 17, 2018

(54) ALKALINITY CONTROL AGENT SUPPLY METHOD AND APPARATUS FOR COMPRESSOR IMPURITY SEPARATION MECHANISM

(71) Applicant: IHI Corporation, Koto-ku (JP)

(72) Inventor: Toshiyuki Naito, Koto-ku (JP)

(73) Assignee: IHI Corporation, Koto-ku (JP)

( * ) Notice: Subject to any disclaimer, the term of this patent is extended or adjusted under 35 U.S.C. 154(b) by 204 days.

(21) Appl. No.: 14/844,694

(22) Filed: Sep. 3, 2015

(65) Prior Publication Data

US 2016/0018159 A1    Jan. 21, 2016

Related U.S. Application Data

(63) Continuation of application No. PCT/JP2014/061534, filed on Apr. 24, 2014.

(30) Foreign Application Priority Data

Apr. 30, 2013  (JP) .................................. 2013-094997

(51) Int. Cl.
*F25J 3/00* (2006.01)
*B01D 5/00* (2006.01)
(Continued)

(52) U.S. Cl.
CPC .............. *F25J 3/08* (2013.01); *B01D 5/0057* (2013.01); *B01D 53/002* (2013.01); *B01D 53/265* (2013.01); *B01D 53/504* (2013.01); *B01D 53/75* (2013.01); *B01D 53/79* (2013.01); *C01B 32/50* (2017.08); *F04B 15/04* (2013.01);
(Continued)

(58) Field of Classification Search
CPC .... F25J 1/0027; F25J 2210/80; F25J 2220/80; F25J 2220/84; F25J 2220/94; F25J 2230/04; F25J 2256/22; F25J 2257/602; F25J 2257/80; B01D 53/64; B01D 53/002;
(Continued)

(56) References Cited

U.S. PATENT DOCUMENTS 9,149,765 B2 * 10/2015 Naito ...................... C01B 31/20
2007/0122328 A1    5/2007 Allam et al.
(Continued)

FOREIGN PATENT DOCUMENTS

JP        6-304432      11/1994
JP        8-290036      11/1996
(Continued)

OTHER PUBLICATIONS

U.S. Appl. No. 14/939,174, filed Nov. 12, 2015, Naito.
(Continued)

*Primary Examiner* — Keith Raymond
(74) *Attorney, Agent, or Firm* — Oblon, McClelland, Maier & Neustadt, L.L.P.

(57)    ABSTRACT

Exhaust gas from which impurities have been removed through pressurization and cooling by a compressor-based impurity separation mechanism is further cooled by a refrigerator-type heat exchanger. Drain produced from the cooling by the refrigerator-type heat exchanger is discharged and supplied as an alkalinity control agent to at least upstream of an aftercooler in a first impurity separator.

10 Claims, 3 Drawing Sheets

(51) Int. Cl.
*F25J 3/08* (2006.01)
*F04B 39/16* (2006.01)
*B01D 53/00* (2006.01)
*B01D 53/26* (2006.01)
*B01D 53/50* (2006.01)
*B01D 53/75* (2006.01)
*B01D 53/79* (2006.01)
*F04B 15/04* (2006.01)
*F25J 1/00* (2006.01)
*C01B 32/50* (2017.01)
*B01D 53/64* (2006.01)
*B01D 53/68* (2006.01)
*F04D 29/58* (2006.01)

(52) U.S. Cl.
CPC .............. *F04B 39/16* (2013.01); *F25J 1/0027* (2013.01); *B01D 53/64* (2013.01); *B01D 53/68* (2013.01); *B01D 2256/22* (2013.01); *B01D 2257/2045* (2013.01); *B01D 2257/302* (2013.01); *B01D 2257/602* (2013.01); *B01D 2258/0283* (2013.01); *F04D 29/5826* (2013.01); *F25J 2205/04* (2013.01); *F25J 2205/30* (2013.01); *F25J 2205/60* (2013.01); *F25J 2210/70* (2013.01); *F25J 2220/80* (2013.01); *F25J 2220/84* (2013.01); *F25J 2230/04* (2013.01); *F25J 2230/30* (2013.01)

(58) Field of Classification Search
CPC .............. B01D 53/265; B01D 2256/22; B01D 2257/602; B01D 2257/80
See application file for complete search history.

(56) References Cited

U.S. PATENT DOCUMENTS

| | | | |
|---|---|---|---|
| 2008/0156035 A1* | 7/2008 | Aspelund | F25J 1/0027 62/606 |
| 2008/0226515 A1 | 7/2008 | Allam et al. | |
| 2012/0014861 A1 | 1/2012 | Hirata et al. | |
| 2013/0319040 A1 | 12/2013 | Naito | |

FOREIGN PATENT DOCUMENTS

| | | |
|---|---|---|
| JP | 2000-51648 | 2/2000 |
| JP | 2007-145709 | 6/2007 |
| JP | 2010-241630 | 10/2010 |
| JP | 2012-505747 | 3/2012 |
| JP | 2012-106163 | 6/2012 |
| JP | 2012-143699 | 8/2012 |
| WO | WO 2010/044956 A1 | 4/2010 |
| WO | WO 2012/107953 A1 | 8/2012 |
| WO | WO 2014/057652 A1 | 4/2014 |
| WO | WO 2014/064894 A1 | 5/2014 |

OTHER PUBLICATIONS

U.S. Appl. No. 14/941,774, filed Nov. 16, 2015, Naito.
International Search Report dated Aug. 5, 2014 in PCT/JPP2014/061534 filed Apr. 24, 2014.
U.S. Appl. No. 14/844,135, filed Sep. 3, 2015, Naito.

* cited by examiner

ALKALINITY CONTROL AGENT SUPPLY METHOD AND APPARATUS FOR COMPRESSOR IMPURITY SEPARATION MECHANISM

TECHNICAL FIELD

The present disclosure relates to a method and an apparatus for supplying an alkalinity control agent for a compressor-based impurity separation mechanism adapted to enhance impurity removal performance by admixing the alkaline agent into exhaust gas upon removal of impurities in the exhaust gas mainly composed of carbon dioxide ($CO_2$) from an oxyfuel combustor, using compressors.

BACKGROUND ART

Recently an oxyfuel combustor has been reviewed as one of techniques for treating carbon dioxide ($CO_2$) which is said to be one of factors for global warming, and attention has been attracted to, for example, a coal-fired boiler for oxyfuel combustion of pulverized coal. In such coal-fired boiler, oxygen is used as an oxidizing agent in lieu of air to produce exhaust gas mainly composed of carbon dioxide ($CO_2$) and such exhaust gas with high $CO_2$ concentration is compressed and cooled into liquefied carbon dioxide. It has been reviewed that such liquefied carbon dioxide is transported by carrying means such as a vessel or a vehicle to a destination for storage thereof in the ground or alternatively the liquefied carbon dioxide increased in pressure is transported through a pipeline to a destination for storage thereof in the ground.

The exhaust gas from the coal-fired boiler upon such oxyfuel combustion of coal contains, in addition to carbon dioxide ($CO_2$), impurities derived from coal feedstock such as nitrogen oxides ($NO_x$), sulfur oxides ($SO_x$), hydrargyrum (Hg), hydrogen chloride (HCl) and dust.

Among the above-mentioned impurities, sulfur oxides ($SO_x$) may be contacted with and dissolved in water into sulfuric acid ($H_2SO_4$) and hydrogen chloride (HCl) may be dissolved in water into hydrochloric acid, so that such water-soluble sulfur oxide and hydrogen chloride as well as dust may be separated through contact with water by means of water splay or the like.

Among the nitrogen oxides ($NO_x$) as the above-mentioned impurities, nitrogen dioxide ($NO_2$) may be contacted with and dissolved in water into nitric acid ($HNO_3$) to become separated. However, the exhaust gas from the coal-fired boiler has less oxygen ($O_2$) so that nitrogen ($N_2$) exists substantially in the form of nitrogen monoxide (NO) which is water-insoluble and thus is unremovable by water spraying or the like.

Among the above-mentioned sulfuric acid, hydrochloric acid and nitric acid, specifically sulfuric acid is known to corrode instruments in the exhaust gas treatment device; and hydrargyrum, which is trace metal as mentioned in the above, is known to hurt low-temperatured aluminum members constituting a heat exchanger arranged for a carbon dioxide liquefier. Thus, it is preferable to remove these impurities in the exhaust gas at early stages. There is also a problem that admixture of the impurities into the exhaust gas lowers a purity degree of the carbon dioxide, which makes troublesome the liquefaction of the carbon dioxide through compression and cooling and thus requires larger-sized equipment for liquefaction. Thus, in a system such as a coal-fired boiler for oxyfuel combustion where exhaust gas mainly composed of carbon dioxide is produced and the carbon dioxide is disposed, it is extremely important to remove impurities in the exhaust gas.

Thus, it has been conducted, for example, in the coal-fired boiler for oxyfuel combustion that a spray-column-type, packed-column-type or other wet desulfurizer used in a conventional air-fired boiler or the like is provided to remove sulfur oxides which are especially problematic in corrosion. Moreover, nitrogen and nitrogen oxides derived from coal feedstock are produced in the exhaust gas from the coal-fired boiler for oxyfuel combustion or the like, so that it has been conducted that a catalyst-type or other denitrator is arranged upstream of the desulfurizer to remove the nitrogen and nitrogen oxides.

It is known in the wet desulfurizer provided as mentioned in the above that sulfur oxides and hydrogen chloride as well as dust are removed and that nitrogen oxides are partly removed and hydrargyrum, which is inherently low in content, is slightly removed. It has been also conceived that if hydrargyrum in the exhaust gas is still high in concentration even after the above-mentioned exhaust gas treatment is conducted, a hydrargyrum-removing column is arranged to remove the hydrargyrum by adsorbent or the like.

As mentioned in the above, the exhaust gas mainly composed of carbon dioxide ($CO_2$) from the coal-fired boiler for oxyfuel combustion usually undergoes compression by a plurality of compressors, cooling by aftercoolers respectively downstream of the compressors and eventual liquefaction into liquefied carbon dioxide. However, in this case, there is a problem that the compressors may be corroded by sulfuric acid ($H_2SO_4$) resulting from sulfur oxides ($SO_x$) included in the exhaust gas. Thus, it is a very important task to prevent the compressors, which are extremely expensive, form being corroded.

Patent Literature 1 discloses an exhaust gas treatment system comprising a duct with a dust collector and a wet desulfurizer to which exhaust gas is guided from a boiler which in turn burns fuel with mixed combustion gas of oxygen-rich gas with circulated exhaust gas, an exhaust gas recirculation duct for guidance of part of the exhaust gas downstream of the dust collector to the boiler and $CO_2$ separation means for compression of the exhaust gas downstream of the desulfurizer to separate carbon dioxide. Water separated in the compression of the exhaust gas by the $CO_2$ separation means is supplied to absorbing liquid circulatorily used in the desulfurizer.

Patent Literature 2 discloses a gas treatment installation in which a gas flow including non-absorbing gas such as a hydrocarbon gas or nitrogen is treated by co-current contactors arranged in series.

Patent Literature 3 discloses a gas treatment apparatus in which raw air is compressed and introduced into a catalyst column where an infinitesimal quantity of carbon monoxide and hydrogen are converted into carbon dioxide and water. Catalyst-reacted temperature-increased air is cooled and introduced into an adsorption column where carbon dioxide, water and other impurities are adsorption-removed to obtain high-purity product air, a remaining part being introduced into and cooled by a primary heat exchanger substantially down to a liquefaction temperature. The cooled remaining part is introduced into a simple rectification column and is subjected to liquefaction rectification to thereby obtain high-purity nitrogen and oxygen-enriched liquefied air.

Patent Literature 4 discloses an exhaust gas treatment apparatus comprising a dust remover for removal of dusts in exhaust gas, an absorbing column arranged downstream of the dust remover for absorptive removal of $SO_x$, HCl and the like, an undercooling mist eliminator arranged downstream of the absorbing column for removal of dusts in an agglomerated bloating manner and a catalyst device for decomposition of harmful matters in the exhaust gas.

Patent Literature 5 discloses a flue gas treatment system for control of pH of an absorbent slurry comprising means for dosing of an alkaline agent into the absorbent slurry, a pH detector of the slurry, means for detection of an operational state of a gas-gas heater, means for detection of an operational state of a dust collector and means for controlling of the dosage of the alkaline agent on the basis of signals from the pH detector, the gas-gas heater and the means for detection of the operational state of the dust collector.

CITATION LIST

Patent Literatures

Patent Literature 1: JP 2012-143699A
Patent Literature 2: JP 2012-505747A
Patent Literature 3: JPH 06-304432A
Patent Literature 4: JP 2000-51648A
Patent Literature 5: JPH 08-290036A

SUMMARY

Technical Problems

However, the conventional exhaust gas treatment system as shown in Patent Literature 1 has problems that equipment for removal of impurities in exhaust gas becomes extreme large in size, complicated in structure and increased in installation cost since the impurities and specifically sulfur oxides ($SO_x$) in the exhaust gas are removed by a spray-column type or other wet desulfurizer arranged.

Thus, a technique has been desired which can remove sulfur oxides and other impurities in exhaust gas guided to compressors at a low cost, using simple equipment.

The disclosure was made in view of the above and has its object to provide a method and an apparatus for supplying an alkalinity control agent for a compressor-based impurity separation mechanism which can remove impurities in exhaust gas from an oxyfuel combustor at a low cost, using simple equipment.

Solution to Problems

The disclosure is directed to an apparatus for supplying an alkalinity control agent for a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwisely compressing carbon dioxide up to a target pressure for liquefaction thereof and aftercoolers for cooling the exhaust gas compressed by the respective compressors through heat exchange with water, water condensed by the cooling being discharged as drain, the apparatus comprising
a refrigerator-type heat exchanger for further cooling the exhaust gas, from which the impurities have been removed, through pressurization and cooling by said compressor-based impurity separation mechanism, a drain receiver for receiving drain produced through the cooling by said refrigerator-type heat exchanger and an alkalinity control agent supply passage for supply of the drain from said drain receiver as an alkalinity control agent to at least upstream of the aftercooler in a first one of the impurity separators.

It is preferable in the apparatus for supplying the alkalinity control agent for the compressor-based impurity separation mechanism that an auxiliary cooler is arranged upstream of said refrigerator-type heat exchanger, the drain from said refrigerator-type heat exchanger being guided as a cooling medium through said alkalinity control agent supply passage to the auxiliary cooler to cool the exhaust gas, drain from said auxiliary cooler being admixed downstream of said auxiliary cooler into the drain in said alkalinity control agent supply passage.

It is preferable in the apparatus for supplying the alkalinity control agent for the compressor-based impurity separation mechanism that an auxiliary cooler and a packed-layer denitrator are arranged upstream and downstream of said refrigerator-type heat exchanger, respectively, drain from said refrigerator-type heat exchanger being supplied to said packed-layer denitrator, drain from said packed-layer denitrator being guided as a cooling medium through said alkalinity control agent supply passage to the auxiliary cooler to thereby cool the exhaust gas, drain from said auxiliary cooler being admixed downstream of said auxiliary cooler into the drain in the said alkalinity control agent supply passage.

Preferably the apparatus for supplying the alkalinity control agent for the compressor-based impurity separation mechanism further comprises a drain tank for reserving a quantity of drain from the aftercooler in the first one of the impurity separator, a drain supply passage for supply of part of the drain from said drain tank to said alkalinity control agent supply passage, a supply valve in said alkalinity control agent supply passage, a mixing valve in said drain supply passage, a pH detector for measuring pH of the drain in said drain tank and a controller for controlling open degrees of said supply and mixing valves so as to keep a pH value detected by said pH detector to a predetermined set value.

It is preferable in the apparatus for supplying the alkalinity control agent for the compressor-based impurity separation mechanism that the controller to which inputted is a detected impurity value of sulfur oxides from an impurity detector arranged downstream of the aftercooler in a last one of the impurity separator is adapted to increase a supply of the alkalinity control agent by said alkalinity control agent supply passage when the detected impurity value of sulfur oxides from the impurity detector exceeds a predetermined set value.

The disclosure is directed to a method for supplying an alkalinity control agent for a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwisely compressing carbon dioxide up to a target pressure for liquefaction thereof and aftercoolers for cooling the exhaust gas compressed by the respective compressors through heat exchange with water, water condensed by the cooling being discharged as drain, the method comprising further cooling the exhaust gas, from which the impurities have been removed through pressurization and cooling by said compressor-based impurity separation mechanism, by a refrigerator-type heat exchanger, discharging drain produced through the cooling by said refrigerator-type heat exchanger, and supplying said drain as an alkalinity control agent to at least upstream of the aftercooler in a first one of the impurity separators.

Advantageous Effects

A method and an apparatus for supplying an alkalinity control agent for a compressor-based impurity separation mechanism according to the disclosure can exhibit an excellent effect that impurities in exhaust gas from an oxyfuel combustor can be removed at a low cost, using simple equipment.

DESCRIPTION OF EMBODIMENTS

Next, embodiments of the disclosure will be described in conjunction with the attached drawings.

Figure 1:
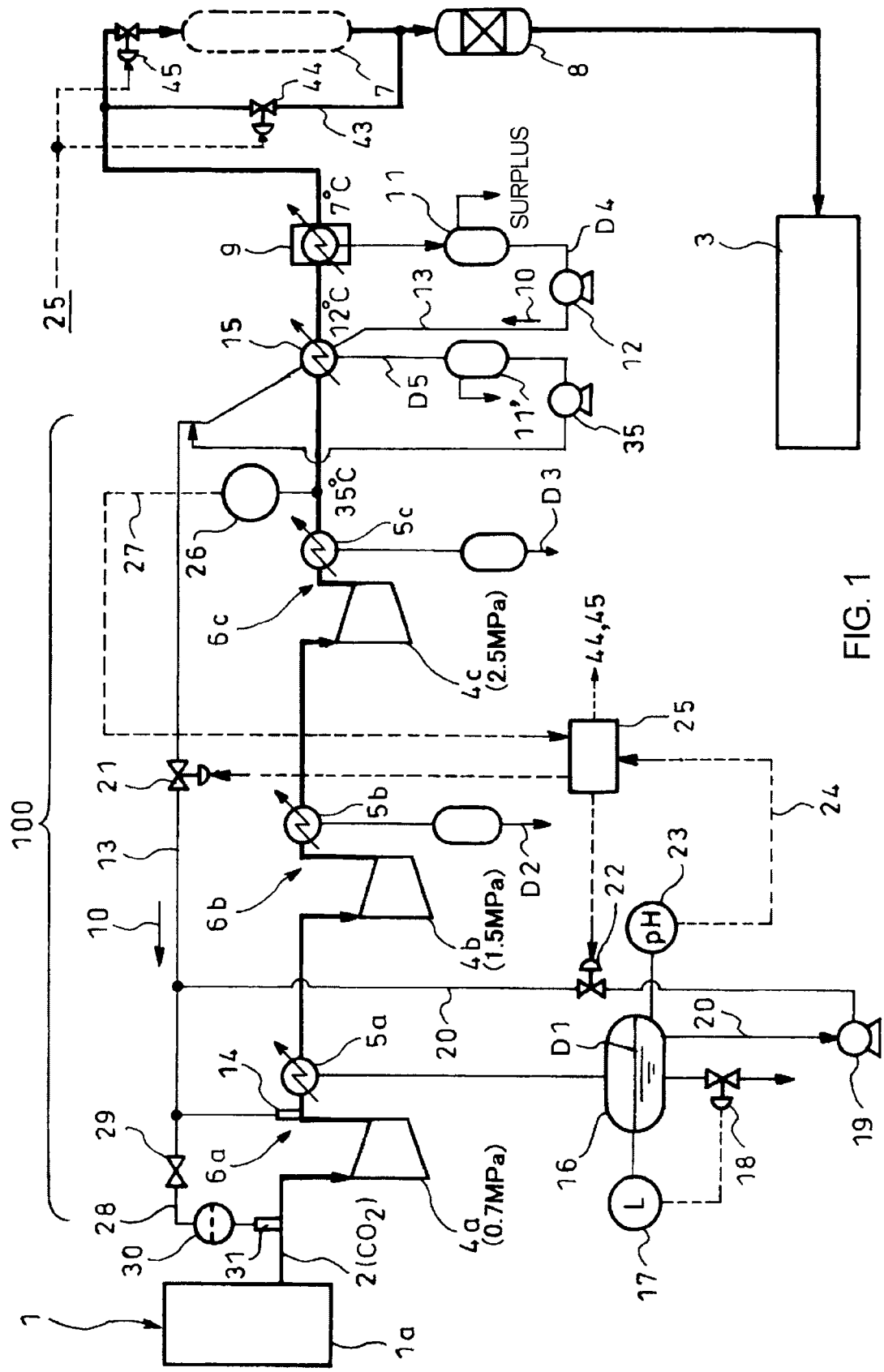
FIG. 1 is a system diagram for showing an embodiment of an apparatus and a method for supplying an alkalinity control agent for a compressor-based impurity separation mechanism for an oxyfuel combustor according to the disclosure.

FIG. 1 is a system diagram for showing an embodiment of an apparatus and a method for supplying an alkalinity control agent for a compressor-based impurity separation mechanism 100 for an oxyfuel combustor according to the disclosure. The embodiment in the apparatus and the method for supplying the alkalinity control agent for the compressor-based impurity separation mechanism 100 comprises the compressor separation mechanism 100, a refrigerator-type heat exchanger 9, a drain receiver 11, an alkalinity control agent supply passage 13, an auxiliary cooler 15, a drain tank 16, a drain supply passage 20, a supply valve 21, a mixing valve 22, a pH detector 23, a controller 25 and an impurity detector 26. In FIG. 1, reference numeral 1 denotes an oxyfuel combustor comprising, for example, a coal-fired boiler 1a for oxyfuel combustion of pulverized coal. Discharged from the oxyfuel combustor 1 is exhaust gas 2 mainly composed of carbon dioxide ($CO_2$). In order to supply and liquefy the exhaust gas 2 from the oxyfuel combustor 1 to and in a carbon dioxide liquefier 3, arranged upstream of the carbon dioxide liquefier 3 is the compressor-based impurity separation mechanism 100 adapted to compress the exhaust gas 2 up to a target pressure, i.e., a predetermined pressure which is a pressure required for liquefaction in the liquefier 3 or approximate to the required pressure to thereby remove impurities in the exhaust gas 2.

The compressor-based impurity separation mechanism 100 shown in FIG. 1 comprises a plurality of impurity separators 6a, 6b and 6c comprising a plurality of (three in the embodiment illustrated) compressors 4a, 4b and 4c for compression of the exhaust gas 2 from the oxyfuel combustor 1 stepwisely up to the target pressure and aftercoolers 5a, 5b and 5c (coolers) for downstream cooling of the exhaust gas 2 compressed in the respective compressors 4a, 4b and 4c to discharge water condensed by the cooling as drains. A cooler arranged between the compressors is generally called as intercooler; however, for ease of explanation, all of the coolers in the disclosure are explained as aftercoolers 5a, 5b and 5c.

Operations of the impurity separators 6a, 6b and 6c for liquefaction of carbon dioxide under various temperature and pressure conditions were studied to find out that it is preferable in the FIG. 1 embodiment to increase a pressure of the exhaust gas up to 2.5 MPa prior to the supply of the carbon dioxide to the carbon dioxide liquefier 3. Thus, 2.5 MPa is set as a target pressure. The target pressure may be set at will.

It is not efficient to pressurize the exhaust gas 2 up to the target pressure of 2.5 MPa all at once by a single compressor 4. Thus, in the embodiment, the three compressors 4a, 4b and 4c are arranged for three-step compressions into 0.75 MPa, 1.5 MPa and 2.5 MPa, thus providing the impurity separators 6a, 6b and 6c. The number of the compressors 4a, 4b and 4c (the number of the impurity separators 6a, 6b and 6c) may be any including 4 or more.

By the compressor impurity separation mechanism 100, the impurities in the exhaust gas 2 can be effectively removed. When a concentration of hydrargyrum (Hg) in the carbon dioxide having passed through the compressor-based impurity separation mechanism 100 is higher than its target value, a hydrargyrum-removing column 7 is arranged downstream of the impurity separation mechanism 100 to remove hydrargyrum, using an adsorbent or the like (the hydrargyrum-removing column 7 is shown in broken line in FIG. 1).

Arranged upstream of the carbon dioxide liquefier 3 (and downstream of the hydrargyrum-removing column 7) is a dryer 8 for removal of water in the carbon dioxide to be supplied to the carbon dioxide liquefier 3.

In the first impurity separator 6a of the compressor-based impurity separation mechanism 100, almost all of the water in the exhaust gas 2 is discharged as drain D1; in the middle impurity separator 6b, drain D2 is discharged which is smaller in quantity than the drain D1; and in the last impurity separator 6c, drain D3 is discharged which is smaller in quantity than the drain D2. The drains D1, D2 and D3 separated in the aftercoolers 5a, 5b and 5c and having impurities are usually supplied to a drainage treatment apparatus for disposal.

In the aftercoolers 5a, 5b and 5c, the exhaust gas 2 is cooled, usually using sea water. Thus, the exhaust gas 2 discharged from the last aftercooler 5c in the FIG. 1 embodiment usually has a temperature of around 35° C.

The inventor found out that the exhaust gas to be guided to the dryer 8 arranged downstream of the compressor-based impurity separation mechanism 100 is preferably cooled to a temperature of around 7° C. for effective drying of the exhaust gas by the dryer 8. Lowering in temperature of the exhaust gas to be guided to the dryer 8 enhances dehumidification performance of the dryer 8 since a saturated temperature of water in the dryer 8 is lowered, whereby the dryer 8 can be reduced in size.

To this end, arranged in the FIG. 1 embodiment downstream of the compressor-based impurity separation mechanism 100 is a refrigerator-type heat exchanger 9 which cools the exhaust gas 2 having been pressurized and cooled by the compressor-based impurity separation mechanism 100 further to around 7° C.

In the refrigerator-type heat exchanger 9, the exhaust gas with the temperature of 32° C. from the compressor-based impurity separation mechanism 100 is cooled down to 7° C., so that the drain D4 is discharged from the refrigerator-type heat exchanger 9.

Figure 3:
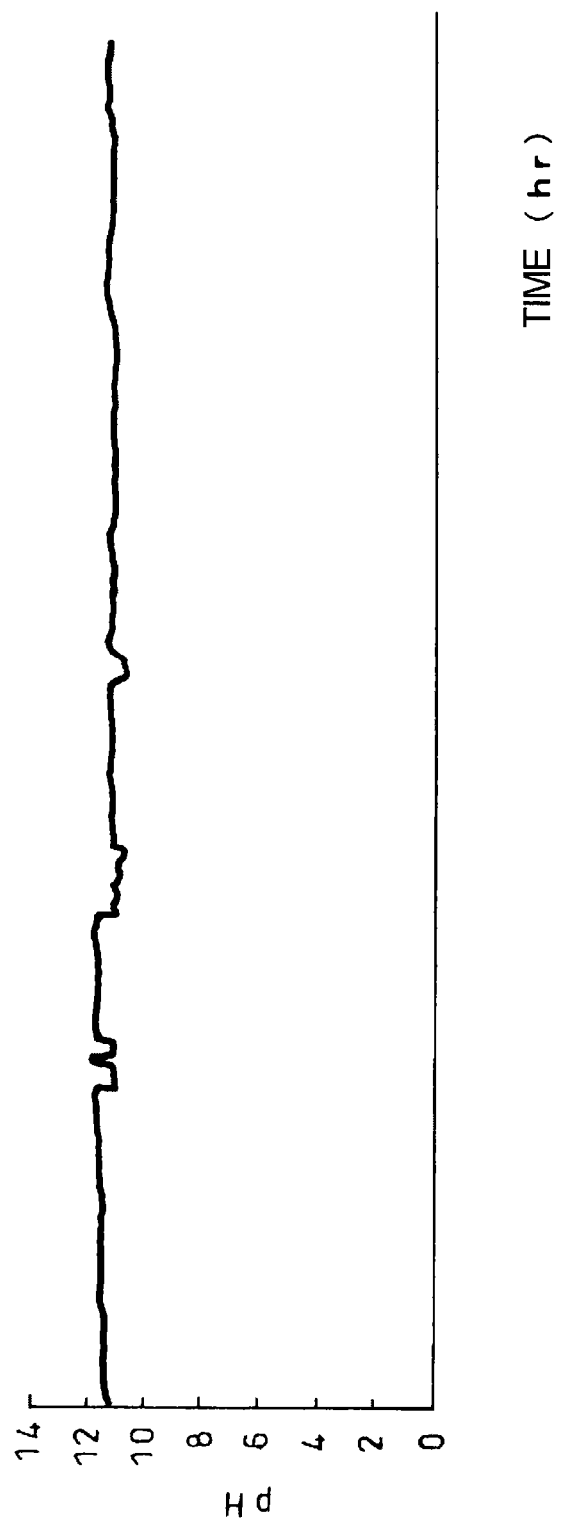
FIG. 3 is a diagram showing a result of a test for measurement of pH of drain discharged from the compressor-based impurity separation mechanism.

The inventor conducted a test for measurement of pH of the drain D4 from the refrigerator-type heat exchanger 9, and a result is shown in FIG. 3. As shown in FIG. 3, it was found out that pH of the drain D4 is continuously 11 or more and does not lower below 11, high pH being constantly indicative. It is conceived that, due to the high pressure of 2.5 MPa in the compressor-based impurity separation mechanism 100, sodium and calcium in the drain D4 react with carbon dioxide ($CO_2$) in the exhaust gas to facilitate production of, for example, sodium bicarbonate ($CHNaO_3$) and calcium bicarbonate ($Ca(HCO_3)_2$), whereby the pH of 11 or more is kept.

Thus, it is found out in the FIG. 1 embodiment that supplying the drain D4 of pH 11 or more from the refrigerator-type heat exchanger 9, as an alkalinity control agent 10, to upstream of the aftercooler 5a in the compressor-based impurity separation mechanism 100 substantially enhances impurity removal performance of the compressor-based impurity separation mechanism 100, so that the embodiment is constructed as follows A drain receiver 11 is arranged to receive the drain D4 produced in the refrigerator-type heat exchanger 9, and an alkalinity control agent supply passage 13 is arranged to supply the drain D4 (the alkalinity control agent 10) from the drain receiver 11 through a pump 12 to upstream of the aftercooler 5a in the first impurity separator 6a. The alkalinity control agent 10 is supplied through the alkalinity control agent supply passage 13 to a nozzle 14 arranged upstream of the aftercooler 5a in the first impurity separator 6a and is admixed into the exhaust gas 2 by the nozzle 14. The nozzle 14 may be arranged at any position between the compressor 4a and the aftercooler 5a.

Further arranged upstream of the refrigerator-type heat exchanger 9 is an auxiliary cooler 15 for cooling of the exhaust gas 2. The cooling of the exhaust gas 2 by the auxiliary cooler 15 produces drain D5 of pH 11 or more in the auxiliary cooler 15, and the drain D5 is received by a drain receiver 11' and pumped by a pump 35 and joined to the alkalinity control agent 10 downstream of the auxiliary cooler 15. The drain D4 from the refrigerator-type heat exchanger 9, which has a temperature as low as 7° C., is guided as a cooling medium through the alkalinity control agent supply passage 13 to the auxiliary cooler 15 to cool the exhaust gas 2. In the auxiliary cooler 15, cold energy of the drain D4 effectively cools the exhaust gas 2 with the temperature of around 35° C. into, for example, around 12° C. Thus, the arrangement of the auxiliary cooler 15 makes it possible to reduce in load or in size of the refrigerator-type heat exchanger 9.

For the aftercooler 5a in the first impurity separator 6a, a drain tank 16 is arranged to store an amount of drain D1 from the aftercooler 5a. The drain tank 16 is provided with a level controller 17 which controls an opening degree of a discharge valve 18 on a drain discharge (downstream) side of the drain tank 16 so as to always keep the detected level to a constant value.

The drain tank 16 is provided with a drain supply passage 20 through which part of the drain D1 in the drain tank 16 is pumped by a pump 19 and is supplied to the alkalinity control agent supply passage 13.

The alkalinity control agent supply passage 13 has a supply valve 21; the drain supply passage 20 has a mixing valve 22; and the drain tank 16 has a pH detector 23 for detection of pH of the drain D1. A pH value 24 detected by the pH detector 23 is inputted to the controller 25 which controls the supply and mixing valves 21 and 22 to control a pH concentration of the alkalinity control agent 10 supplied to the nozzle 14 such that the detected pH value 24 is kept to a predetermined set value of, for example, pH 5.

Arranged on an exit (downstream) side of the aftercooler 5c in the last impurity separator 6c where the exhaust gas 2 is discharged is an impurity sensor 26 for detection of impurities (e.g., sulfur oxides) in the exhaust gas 2, and an impurity value 27 detected in terms of sulfur oxides by the impurity sensor 26 is inputted to the controller 25 which in turn conducts an emergency control on the supply and mixing valves 21 and 22 to increase the supply of the alkalinity control agent 10 when the impurity value 27 detected in terms of sulfur oxides by the impurity sensor 26 exceeds a predetermined set value. The exit side of the aftercooler 5c is preferable as a position of the impurity sensor 26 for quick detection of the impurities in the exhaust gas 2; however, it may be arranged at any position downstream of the aftercooler 5c and between the aftercooler 5c and the dryer 8 (or the hydrargyrum-removing column 7). Provided for the hydrargyrum-removing column 7 is a bypass duct 43 for changeover, by a command from the controller 25 to changeover valves 44 and 45, between flows of the exhaust gas 2 passing and not passing through the hydrargyrum-removing column 7.

Further, in the FIG. 1 embodiment, the alkalinity control agent supply passage 13 has a branch passage 28 which is provided with a control valve 29, a filter 30 and a spray nozzle 31 and is adapted to supply the alkalinity control agent 10 upstream of the first compressor 4a through the spray nozzle 31. The alkalinity control agent 10 is supplied at least upstream of the first aftercooler 5a; in this case, part of the alkalinity control agent 10 may be supplied upstream of the first compressor 4a. For such supply of the alkalinity control agent 10 upstream of the first compressor 4a, designing is to be made so as to have room in capacity of the compressor-based impurity separation mechanism 100.

Next, a mode of operation of the above embodiment will be described.

The exhaust gas 2 mainly composed of carbon dioxide resulting from the oxyfuel combustion in the oxyfuel combustor 1 is guided with a pressure of, for example, 0.1 MPa (one atmosphere of pressure) to the compressor 4a in the first impurity separator 6a in the compressor-based impurity separation mechanism 100 and is pressurized by the compressor 4a to 0.7 MPa. The exhaust gas 2 pressurized by the compressor 4a to 0.7 MPa is supplied to and cooled by the adjacent aftercooler 5a from which the drain D1 is discharged in large quantity. In this case, effectively removed from the first aftercooler 5a are most of the water-soluble impurities, i.e., sulfur oxides and hydrogen chloride and dust in the exhaust gas 2. Specifically, the water-soluble impurities, i.e., sulfur oxides and hydrogen chloride are removed in a high removal ratio together with the drain D1 discharged in large quantity from the first aftercooler 5a.

The exhaust gas 2 cooled by the aftercooler 5a is guided to and pressurized by the compressor 4b in the downstream (succeeding) impurity separator 6b to 1.5 MPa. The exhaust gas 2 pressurized to 1.5 MPa is cooled by the adjacent aftercooler 5b from which drain D2 is discharged in an amount smaller than that from the aftercooler 5a. And, due to the pressure being elevated by the compressor 4b, parts of sulfur oxides and hydrogen chloride are also removed in the downstream aftercooler 5b together with the small amount of drain D2.

The exhaust gas 2 cooled by the aftercooler 5b is guided to and pressurized by the compressor 4c in the last impurity separator 6c to 2.5 MPa. The exhaust gas 2 compressed by the compressor 4c to 2.5 MPa is cooled by the adjacent aftercooler 5c, and drain D3 is discharged from the aftercooler 5c in an amount still smaller than that in the aftercooler 5b.

The exhaust gas 2 guided to the last aftercooler 5c in the last impurity separator 6c has been pressurized stepwise by the compressors 4a, 4b and 4c up to 2.5 MPa, so that nitrogen monoxide (NO) in the exhaust gas 2 is changed into water-soluble nitrogen dioxide ($NO_2$) owing to accelerated oxidization through the pressurization. Thus, the nitrogen dioxide ($NO_2$) is dissolved in water into nitric acid ($HNO_3$) and is discharged together with the drain D3. As a result, nitrogen oxides in the exhaust gas is removed with high removal ratio. Further, when the temperature of the exhaust gas 2 is lowered with the pressure being unchanged, absorption of the gas into drain is enhanced; therefore, more nitrogen oxides are removed with the drain D5 from the auxiliary cooler 15 or with the drain D4 from the refrigerator-type heat exchanger 9 than those with the drain D3.

In the above, the drain D4 produced in the refrigerator-type heat exchanger 9 is supplied to the drain receiver 11; the drain D4 in the drain receiver 11 is supplied as the alkalinity control agent 10 by the pump 12 through the alkalinity control agent supply passage 13 to the auxiliary cooler 15 to cool the exhaust gas 2, and then is supplied by the nozzle 14 to the exhaust gas 2 upstream of the aftercooler 5a in the first impurity separator 6a. Further, it may be supplied by the nozzle 31 to the exhaust gas 2 upstream of the compressor 4a. The drain D5 produced in the auxiliary cooler 15 upstream of the refrigerator-type heat exchanger 9 is mixed by the pump 35 with the alkalinity control agent 10 downstream of the auxiliary cooler 15.

The drain D1 from the first aftercooler 5a and stored in the drain tank 16 is supplied for mixing to the alkalinity control agent supply passage 13 through the drain supply passage 20. The alkalinity control agent 10 which is in the alkalinity control agent supply passage 13 and is diluted from pH 11 or more to the predetermined pH by the supply, through the drain supply passage 20, of the drain D1 adjusted to pH 5 as mentioned hereinafter is supplied to the nozzle 14 or to the nozzles 14 and 31.

Dissolution of plenty of sulfur oxides in the exhaust gas into the drain D1 would substantially lower the pH of the drain D1 (into, for example, around pH 1) and make the drain D1 into a saturated state, leading to substantial lowering in dissolution of the sulfur oxides into the drain D1. However, the controller 25 adjusts the supply and mixing valves 21 and 22 respectively in the passages 13 and 20 for supply of the alkalinity control agent to upstream of the first aftercooler 5a such that the detected pH value 24 of the drain D1 from the aftercooler 5a is kept to the set value of, for example, pH 5, so that continuously discharged from the aftercooler 5a is the drain D1 from which the impurities have been removed with high removal ratio.

The drains D4 and D5 with pH 11 or more respectively from the refrigerator-type heat exchanger 9 and the auxiliary cooler 15 and supplied as the alkalinity control agent 10 to upstream of the aftercooler 5a can be ensured in amounts enough for keeping the pH of the drain D1 to the set value of pH 5. Surplus drains D4 and D5 are discharged from the drain receivers 11 and 11' to a drainage treatment device for disposal.

The supply of the alkalinity control agent 10 keeps the pH of the exhaust gas 2 guided to the aftercooler 5a in highly reductive atmosphere. Thus, the water-soluble impurities in the exhaust gas and especially sulfur oxides and hydrogen chloride are enhanced in dissolubility in the drain D1, so that the impurities are effectively removed.

Further, the detected impurity value 27 on sulfur oxides from the impurity detector 26 arranged downstream of the aftercooler 5c in the last impurity separator 6c is inputted to the controller 25. The controller 25 serves to increase the supply of the alkalinity control agent 10 through the alkalinity control agent supply passage 13 when the detected impurity value 27 on sulfur oxides exceeds the predetermined set value, which can prevent occurrence of any problem which may substantially lower impurity removal performance of the compressor-based impurity separation mechanism 100.

Figure 2:
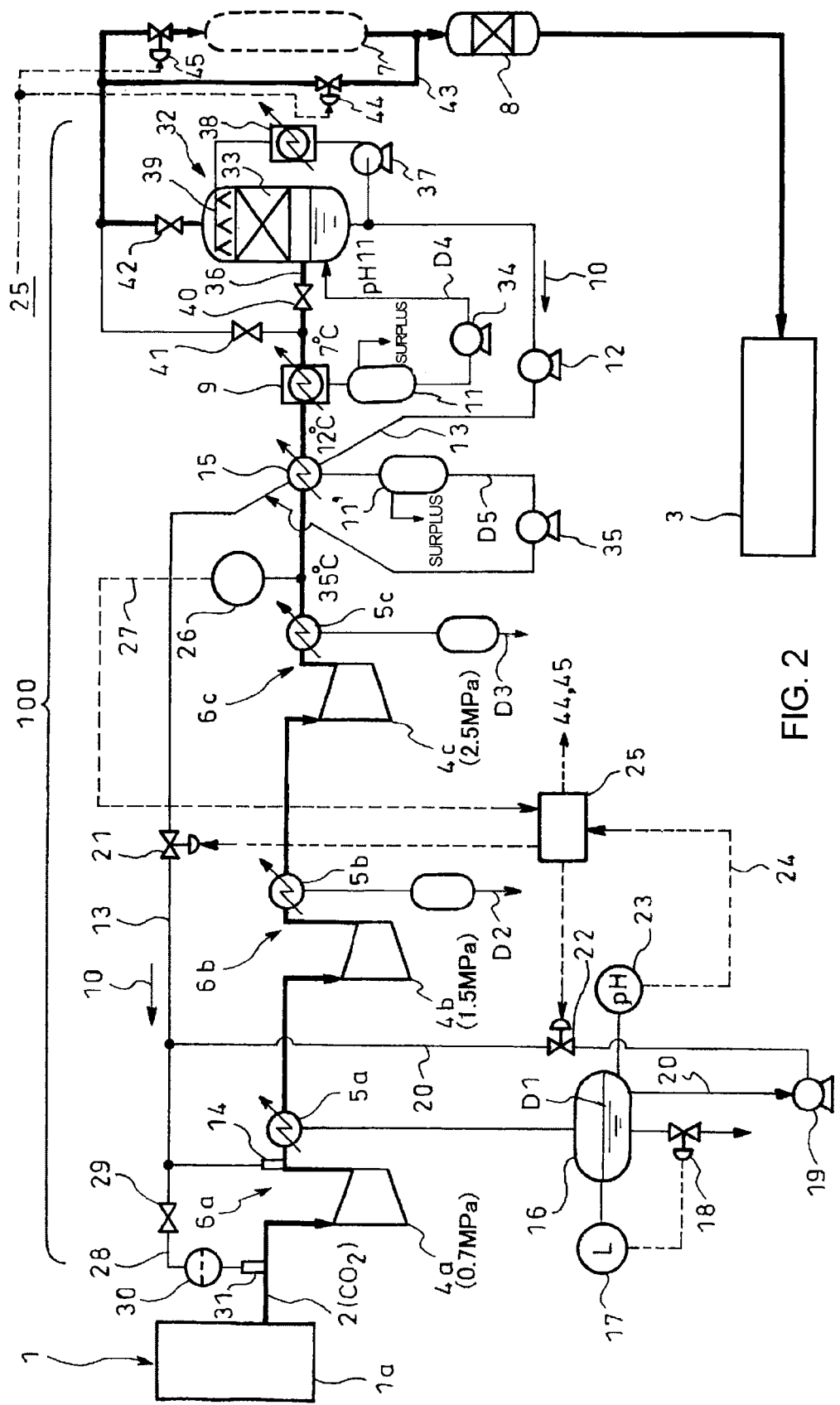
FIG. 2 is a system diagram for showing a further embodiment of the apparatus and the method for supplying the alkalinity control agent for the compressor-based impurity separation mechanism according to the disclosure.

FIG. 2 is a system diagram which shows a further embodiment of an apparatus and a method for supplying an alkalinity control agent for a compressor-based impurity separation mechanism 100 according to the disclosure. The further embodiment of the apparatus and the method for supplying the alkalinity control agent for the compressor-based impurity separation mechanism 100 comprises the compressor-based impurity separation mechanism 100, a refrigerator-type heat exchanger 9, a drain receiver 11, an alkalinity control agent supply passage 13, an auxiliary cooler 15, a drain tank 16, a drain supply passage 20, a supply valve 21, a mixing valve 22, a pH detector 23, a controller 25, an impurity detector 26 and a packed-layer denitrator 32. In FIG. 2 embodiment, arranged upstream and downstream of the refrigerator-type heat exchanger 9 are the auxiliary cooler 15 and the packed-layer denitrator 32 to which the exhaust gas 2 is guided through a bypass duct 36, respectively.

The packed-layer denitrator 32 is provided with a packed layer 33 for removal of nitrogen oxides in the exhaust gas. Supplied to the packed-layer denitrator 32 through a pump 34 is drain D4 discharged from the refrigerator-type heat exchanger 9.

Then, the drain D4 in the packed-layer denitrator 32 is pumped out by a pump 12 as an alkalinity control agent 10; the alkalinity control agent 10 is guided as a cooling medium through the alkalinity control agent supply passage 13 to the auxiliary cooler 15 for heat exchange and is supplied upstream of the first aftercooler 5a. In the auxiliary cooler 15, drain D5 with pH 11 or more is produced. The drain D5 is received by a drain receiver 11' and is joined by a pump 35 to the alkalinity control agent 10 downstream of the auxiliary cooler 15. The drain D4 discharged from a lower part of the packed-layer denitrator 32 is partly sprayed to the packed layer 33 in the packed-layer denitrator 32 through a circulation pump 37, a refrigerator-type heat exchanger 38 and a nozzle 39. Thus, the spray to the packed layer 33 of the drain D4 kept to a high pH concentration (of pH 11 or more) due to the kept high pressure of 2.5 MPa and kept to a temperature as low as 7° C. substantially enhances nitrogen oxides removal performance of the packed layer 33. In the figures, reference numerals 40, 41 and 42 denote change-over valves for changeover between flows of the exhaust gas 2 passing through the packed-layer denitrator 32 via the bypass duct 36 and not passing therethrough.

As mentioned in the above, according to the disclosure, the exhaust gas 2 to which the impurities have been removed through the pressurization and cooling by the compressor-based impurity separation mechanism 100 is further cooled by the refrigerator-type heat exchanger 9. The drain D4 produced from the cooling by the refrigerator-type heat exchanger 9 is discharged. The drain D4, which has pH 11 or more, is supplied as the alkalinity control agent 10 to at least upstream of the aftercooler 5a in the first impurity separator 6a so that, without use of an expensive alkalinity control agent such as sodium hydroxide (NaOH), impurities in the exhaust gas can be effectively removed at low cost using simple equipment.

The auxiliary cooler 15 is arranged upstream of the refrigerator-type heat exchanger 9 and the drain D5 produced in the auxiliary cooler 15 is joined to the alkalinity control agent 10 downstream of the auxiliary cooler 15, so that the alkalinity control agent comprising the drains D4 and D5 can be increased in discharged amounts. Further, the low-temperatured drain D4 is guided as the cooling medium to the auxiliary cooler 15 through the alkalinity control agent supply passage 13 to cool the exhaust gas 2, so that cold energy of the drain D4 can be effectively utilized for cooling of the exhaust gas 2 in the auxiliary cooler 15.

The auxiliary cooler 15 and the packed-layer denitrator 32 are arranged upstream and downstream of the refrigerator-type heat exchanger 9, respectively, and the drain D4 kept to the high pH concentration (of pH 11 or more) due to the kept high pressure of 2.5 MPa from the refrigerator-type heat exchanger 9 and kept to the temperature as low as 7° C. is sprayed to the packed layer 33 in the packed-layer denitrator 32, so that nitrogen oxides removal performance of the packed layer 33 can be substantially enhanced due to the low temperature being kept. The drain D4 from the packed-layer denitrator 32 is guided to the auxiliary cooler 15 through the alkalinity control agent supply passage 13 to cool the exhaust gas 2, so that the cold energy of the drain D4 can be effectively utilized for cooling of the exhaust gas 2 in the auxiliary cooler 15. Further, the drain D5 produced in the auxiliary cooler 15 is joined to the alkalinity control agent 10 downstream of the auxiliary cooler 15, so that a discharge amount of the alkalinity control agent comprising the drains D4 and D5 can be increased.

Provided are the drain tank 16 for storage of an amount of drain D1 from the aftercooler 5a in the first impurity separator 6a, the drain supply passage 20 for supply of part of the drain D1 in the drain tank 16 to the alkalinity control agent supply passage 13, the supply valve 21 in the alkalinity control agent supply passage 13, the mixing valve 22 in the drain supply passage 20, the pH detector 23 for measurement of pH of the drain D1 in the drain tank 16 and the controller 25 for control of the supply and mixing valves 21 and 22 such that the pH value 24 detected by the pH detector 23 is kept to a predetermined set value, so that pH of the drain D1 is kept to, for example, pH 5. Thus, the aftercooler 5a removes the impurities with a stabilized high removal ratio.

The controller 25, to which inputted is the detected impurity value 27 of sulfur oxides from the impurity detector 26 downstream of the aftercooler 5c in the last impurity separator 6c, is adapted to increase the supply of the alkalinity control agent 10 through the alkalinity control agent supply passage 13 when the detected impurity value 27 of sulfur oxides from the impurity detector 26 exceeds a predetermined set value, so that prevented is any problem which may substantially lower the impurities removal performance of the compressor-based impurity separation mechanism 100.

It is to be understood that a method and an apparatus for supplying an alkalinity control agent for a compressor-based impurity separation mechanism according to the disclosure are not limited to the above embodiments and that various changes and modifications may be made without departing from the scope of the disclosure.

REFERENCE SIGNS LIST 1 oxyfuel combustor
1a coal-fired boiler (oxyfuel combustor)
2 exhaust gas
3 carbon dioxide liquefier
4 compressor
4a compressor
4b compressor
4c compressor
5 aftercooler
5a aftercooler
5b aftercooler
5c aftercooler
6a impurity separator
6b impurity separator
6c impurity separator
9 refrigerator-type heat exchanger
10 alkalinity control agent
11 drain receiver
13 alkalinity control agent supply passage
15 auxiliary cooler
16 drain tank
17 level controller
20 drain supply passage
21 supply valve
22 mixing valve
23 pH detector
24 pH value detected
25 controller
26 impurity detector
27 impurity value detected
32 packed-layer denitrator
100 compressor-based impurity separation mechanism
D1 drain
D2 drain
D3 drain
D4 drain
D5 drain

The invention claimed is:

1. An apparatus for supplying an alkalinity control agent for a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwisely compressing carbon dioxide up to a target pressure for liquefaction thereof and aftercoolers for cooling the exhaust gas compressed by the respective compressors through heat exchange with water, water condensed by the cooling being discharged as drain, the apparatus comprising:
a refrigerator-type heat exchanger for further cooling the exhaust gas to a temperature near a freezing point of water, from which the impurities have been removed, through pressurization and cooling by said compressor-based impurity separation mechanism;
a drain receiver for receiving drain produced through the cooling by said refrigerator-type heat exchanger; and
an alkalinity control agent supply passage for supply of the drain from said drain receiver as an alkalinity control agent to at least upstream of the aftercooler in a first one of the impurity separators to mix the drain with the exhaust gas.

2. The apparatus for supplying the alkalinity control agent for the compressor-based impurity separation mechanism as claimed in claim 1, wherein an auxiliary cooler is arranged upstream of said refrigerator-type heat exchanger, the drain from said refrigerator-type heat exchanger being guided as a cooling medium through said alkalinity control agent supply passage to the auxiliary cooler to cool the exhaust gas, drain from said auxiliary cooler being admixed downstream of said auxiliary cooler into the drain in said alkalinity control agent supply passage.

3. The apparatus for supplying the alkalinity control agent for the compressor-based impurity separation mechanism as claimed in claim 1, wherein an auxiliary cooler and a packed-layer denitrator are arranged upstream and downstream of said refrigerator-type heat exchanger, respectively, drain from said refrigerator-type heat exchanger being supplied to said packed-layer denitrator, drain from said packed-layer denitrator being guided as a cooling medium through said alkalinity control agent supply passage to the auxiliary cooler to thereby cool the exhaust gas, drain from said auxiliary cooler being admixed downstream of said auxiliary cooler into the drain in the said alkalinity control agent supply passage.

4. The apparatus for supplying the alkalinity control agent for the compressor-based impurity separation mechanism as claimed in claim 1, further comprising a drain tank for reserving a quantity of drain from the aftercooler in the first one of the impurity separator, a drain supply passage for supply of part of the drain from said drain tank to said alkalinity control agent supply passage, a supply valve in said alkalinity control agent supply passage, a mixing valve in said drain supply passage, a pH detector for measuring pH of the drain in said drain tank and a controller for controlling open degrees of said supply and mixing valves so as to keep a pH value detected by said pH detector to a predetermined set value.

5. The apparatus for supplying the alkalinity control agent for the compressor-based impurity separation mechanism as claimed in claim 2, further comprising a drain tank for reserving a quantity of drain from the aftercooler in the first one of the impurity separator, a drain supply passage for supply of part of the drain from said drain tank to said alkalinity control agent supply passage, a supply valve in said alkalinity control agent supply passage, a mixing valve in said drain supply passage, a pH detector for measuring pH of the drain in said drain tank and a controller for controlling open degrees of said supply and mixing valves so as to keep a pH value detected by said pH detector to a predetermined set value.

6. The apparatus for supplying the alkalinity control agent for the compressor-based impurity separation mechanism as claimed in claim 3, further comprising a drain tank for reserving a quantity of drain from the aftercooler in the first one of the impurity separator, a drain supply passage for supply of part of the drain from said drain tank to said alkalinity control agent supply passage, a supply valve in said alkalinity control agent supply passage, a mixing valve in said drain supply passage, a pH detector for measuring pH of the drain in said drain tank and a controller for controlling open degrees of said supply and mixing valves so as to keep a pH value detected by said pH detector to a predetermined set value.

7. The apparatus for supplying the alkalinity control agent for the compressor-based impurity separation mechanism as claimed in claim 4, wherein the controller to which inputted is a detected impurity value of sulfur oxides from an impurity detector arranged downstream of the aftercooler in a last one of the impurity separator is adapted to increase a supply of the alkalinity control agent by said alkalinity control agent supply passage when the detected impurity value of sulfur oxides from the impurity detector exceeds a predetermined set value.

8. The apparatus for supplying the alkalinity control agent for the compressor-based impurity separation mechanism as claimed in claim 5, wherein the controller to which inputted is a detected impurity value of sulfur oxides from an impurity detector arranged downstream of the aftercooler in a last one of the impurity separator is adapted to increase a supply of the alkalinity control agent by said alkalinity control agent supply passage when the detected impurity value of sulfur oxides from the impurity detector exceeds a predetermined set value.

9. The apparatus for supplying the alkalinity control agent for the compressor-based impurity separation mechanism as claimed in claim 6, wherein the controller to which inputted is a detected impurity value of sulfur oxides from an impurity detector arranged downstream of the aftercooler in a last one of the impurity separator is adapted to increase a supply of the alkalinity control agent by said alkalinity control agent supply passage when the detected impurity value of sulfur oxides from the impurity detector exceeds a predetermined set value.

10. A method for supplying an alkalinity control agent for a compressor-based impurity separation mechanism wherein impurities in exhaust gas mainly composed of carbon dioxide from an oxyfuel combustor are removed, before supplying of the exhaust gas to a carbon dioxide liquefier, by the compressor-based impurity separation mechanism comprising a plurality of impurity separators having a plurality of compressors for stepwisely compressing carbon dioxide up to a target pressure for liquefaction thereof and aftercoolers for cooling the exhaust gas compressed by the respective compressors through heat exchange with water, water condensed by the cooling being discharged as drain, the method comprising:
further cooling the exhaust gas to a temperature near a freezing point of water, from which the impurities have been removed through pressurization and cooling by said compressor-based impurity separation mechanism, by a refrigerator-type heat exchanger;
discharging drain produced through the cooling by said refrigerator-type heat exchanger; and
supplying said drain as an alkalinity control agent to mix the drain with the exhaust gas at least upstream of the aftercooler in a first one of the impurity separators.

* * * * *